United States Patent

[11] 3,550,740

| [72] | Inventors | Walter J. LeBlanc;<br>Ralph R. Main, Troy, Ohio |
|---|---|---|
| [21] | Appl. No. | 726,316 |
| [22] | Filed | May 3, 1968 |
| [45] | Patented | Dec. 29, 1970 |
| [73] | Assignee | The B. F. Goodrich Company<br>New York, N.Y.<br>a corporation of New York |

[54] SEGMENTED FRICTION MEMBER FOR BRAKE OR CLUTCH
11 Claims, 4 Drawing Figs.

[52] U.S. Cl. .................................................. 192/107,
188/218, 192/70.2
[51] Int. Cl. ................................................... F16d 69/00
[50] Field of Search ........................................ 192/107,
70.2; 188/218 Axial, 240, 241

[56] References Cited
UNITED STATES PATENTS

| 3,433,334 | 3/1969 | Kershner | 192/107X |
| 3,452,844 | 7/1969 | Lallemant | 192/107X |
| 2,108,059 | 2/1938 | Glasner | 192/107X |
| 2,247,298 | 6/1941 | Kattwinkel | 192/107 |
| 2,555,183 | 5/1951 | Butler | 192/107X |
| 3,397,760 | 8/1968 | Robins et al. | 192/107 |
| 2,610,719 | 9/1952 | Hornbostel | 192/107 |

*Primary Examiner*—Benjamin W. Wyche
*Attorneys*—John D. Haney and Harold S. Meyer ABSTRACT: A brake or clutch mechanism that has at least one of its stators or rotors composed of individual thick plane segments assembled to collectively form an annulus, with each segment connected from one of its corners to the corner of the next adjoining segment by a special torque-link member. The torque-link members additionally provide splined engagement with an associated part of the brake or clutch for transmitting torque to or from the annular segment assembly. Segmented assemblies of this type are especially useful as the friction engaging members in high energy disc brakes.

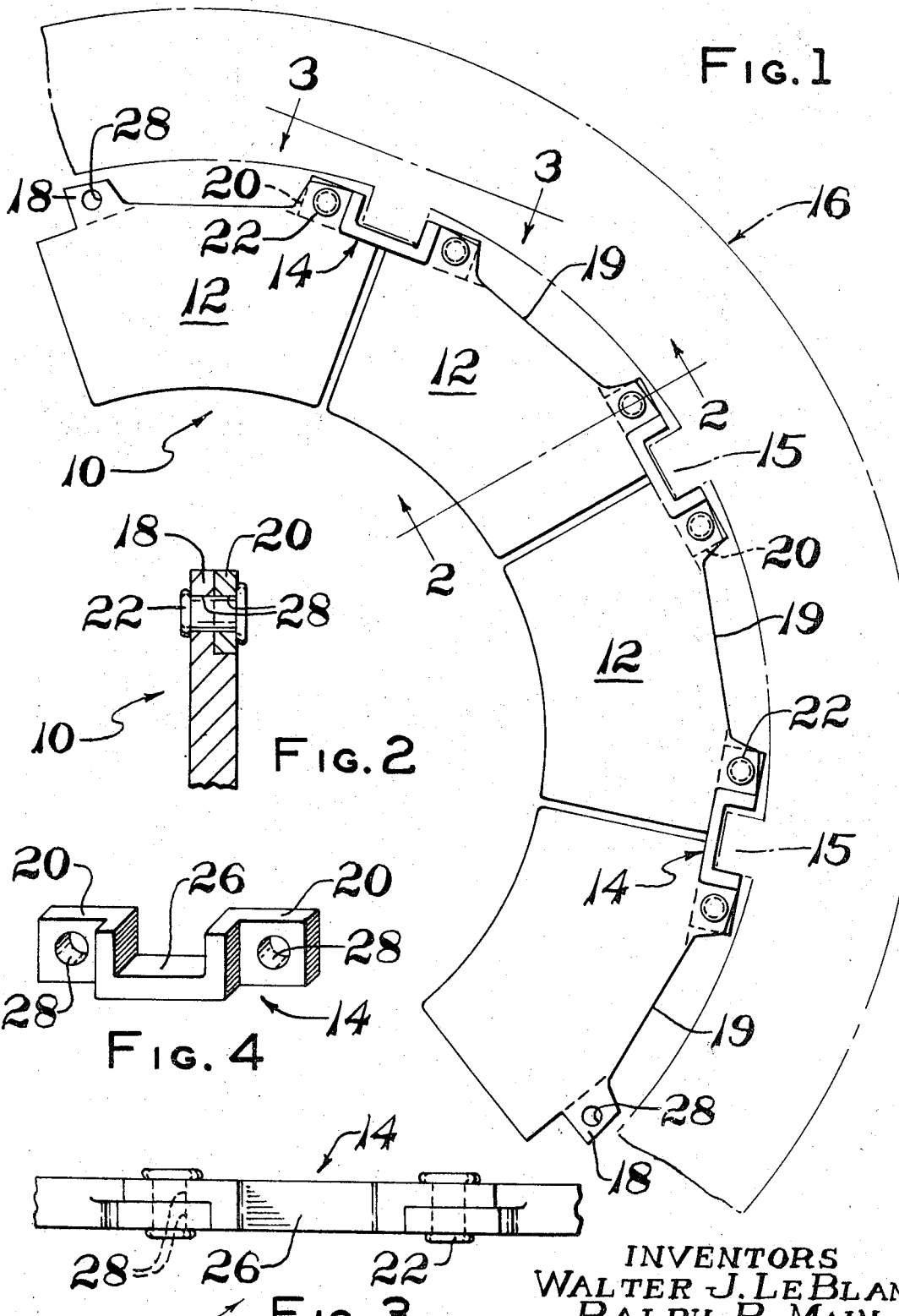

SEGMENTED FRICTION MEMBER FOR BRAKE OR CLUTCH

BACKGROUND OF THE INVENTION

This invention relates to segmented annular friction members particularly useful in disc style brakes or clutches. A segmented assembly according to this invention is normally used as one element of the friction couple of a brake or clutch. The assembly may be employed as the so-called heat slink disc element in a high energy brake, or it may be used as the lining carrying component of the same assembly, or both. In the following description, the invention is described with relation to a form of assembly useful as a rotor heat slink disc in a high energy aircraft style brake.

For more than 30 years, it has been recognized that assemblies of segmented friction components in a high energy brake are useful to avoid the problems caused by thermal warpage and cracking characteristics of solid annular braking components. Some early forms of segmented disc assemblies provide for almost complete freedom of movement of their respective segment components by interconnecting the segments solely by loose fitting keys projecting from one segment to the next. These assemblies satisfactorily avoid the thermal warpage problems but are quite inconvenient for field use because they ordinarily have no structural rigidity and, consequently, are very difficult to assemble and service. Moreover, the keys in these assemblies are necessarily in the so-called "swept" area, and are therefore subject to the intense heat generated at the friction interfaces of the brake members with resulting damage to the keys and the related parts of the assembly.

A majority problem with key-connected segmented discs has been in their inherent lack of dimensional uniformity from one driving lug to another on the disc assembly. The driving lugs in these assemblies are ordinarily integral with the segments, and when the segments warp under their thermal loads, these driving lugs often tend to bind on their adjoining splined parts such as the wheel driving lugs and interfere with the proper operation of the brake. Alternatively, the segments may thermally warp in such a way that only a few of the total number of driving lugs are in effective driving engagement, resulting in overloading and destruction of the lugs.

To avoid the foregoing disadvantages of the key-connected segmented style discs, and yet preserve the advantages of segmenting the major portion of the assembly, it has been proposed to mount the individual segments on a supporting skeleton which includes a continuous annular ring with or without integral driving lugs associated with the ring rather than the segments. In these constructions, binding of the driving lugs generally is avoided because of the resulting dimensional stability from one lug to another, but these constructions in general represent a regression or retreat from the design concept of the use of individual unrestrained disc segments. The annular skeletons themselves, for example, may be subject to thermal distortion and, in general, the assembly is more complex and therefore more expensive than the early key-connected segmented designs. Moreover, in order to assemble the segments with the supporting rigid skeleton, the segments ordinarily have been undercut or grooved in various places to mate with the supporting ring-like skeleton thereby providing for unequal heat distribution in the individual segments and the possibility of premature failure in the thinner regions of the segments.

SUMMARY OF THE INVENTION

According to this invention, an annular segmented friction member is provided in which the individual segments have maximum unrestrained freedom of movement when subject to high thermal stress, but are nevertheless positively interconnected one to another by simple individual so-called torque link members which are ordinarily outside the high temperature zones swept during the engagement of the friction members. These links serve the dual function of providing driving engagement with the associated parts of the mechanism such as the wheel, and they provide adequate dimensional stability to avoid any problems of the assembly binding on the wheel or other associated part.

The opposing ends of each torque link are connected by a simple rivet connection to their respective segments in a manner which allows the segments a rotary or rocking movement relative to the link when the segments undergo thermal distortion. Moreover, these torque links may be made of a wide variety of materials depending on the conditions required in the particular design, without prejudicing or limiting the selection of the materials which are best suited for the heat sink segments per se.

The torque links themselves are ordinarily made laterally wider than the widest release clearance possible between the adjoining engageable friction members of the brake or clutch. Therefore, even though a torque link should break in service there is no reasonable possibility that it can become wedged between the engageable friction members to damage them or impair their proper engagement.

One improved characteristic of this assembly is that the portions of the segments which are in the friction swept areas and which are subjected to the maximum heat loads are of uniform solid thickness throughout the swept area. The segments preferably have no regions of varying thickness within the areas of them subjected to the friction heat load. Accordingly, complex and expensive stress relief slotting in these segments is unnecessary.

The accompanying drawings show one preferred form of a segmented brake assembly made in accordance with and embodying this invention and which is representative of how this invention may be practiced in the design of segmented friction members.

BRIEF DESCRIPTION OF THE DRAWINGS

In the drawings:

FIG. 1 is a side view of a part of an annular disc assembly (shown in solid lines) and illustrated in torque driving engagement with a related part which in this example may be a rotatable wheel, the sides of which are represented by the chain dotted lines;

FIGS. 2 and 3 are detailed views of the disc assembly taken along the lines 2-2 and 3-3 of FIG. 1; and FIG. 4 is a view showing separately the particular form of torque link used in the FIG. 1 assembly.

DETAILED DESCRIPTION

Referring to FIG. 1, a segmented friction disc assembly 10 includes a series of arcuate sector-shaped segments 12 of identical size and shape and which are interconnected one to another at their radially outer corners by torque links 14. The torque links are in driving engagement with mating interfitting driving pieces 15 on an associated rotatable member 16 which is represented in the chain dotted lines and which in this example may be a wheel rim. The disc assembly 10 is used as a rotor in this example, but it may be used if desired as a stator, as will be evident to those skilled in the art.

Each segment 12 is of uniform thickness except for a pair of integral lugs 18 which are thinner than the remaining arcuate body portions of the segment, and which are located near the radially outer corners on the outside edges 19 of the segments.

Each torque link 14 at its opposite ends has end flanges 20 as shown in FIG. 4 which mate laterally against the lugs 18 as shown in FIG. 2. Each flange 20 is fastened to its respective lug 18 by a single rivet 22. Although the particular details are not shown in the drawings, appropriate clearances are provided between the edges of the end flanges 20 of the links, and the adjoining edges of the segments 12 near the lugs 18 to permit relative rocking motion between the segment lugs 18 and the link flanges 20 about the rivet connectors 22. Although in the initial assembly the link flanges may be fastened tightly to the lugs 18 so that the assembly has structural rigidity for handling and assembly purposes, the connection is such that there is no restraint against such limited rocking motion as may occur from thermal distortion of the segments.

As shown in FIG. 2, preferably the segment lugs 18 are formed with one side substantially flush with one rubbing face of the disc segment. The lug 18 is about half the thickness of the segment; the opposing side of the lug 18 is rabbeted with the body of the segment to receive the flange 20 of the torque link so that the combined thickness of the lug 18 and the flange 20 is about equal to the thickness of the body of the segment.

Intermediate its end flanges 20, each torque link 14 has a generally channel-shaped body 26 the convex side of which conforms to the contour of the segment between each lug 18 and the radial end edge 27 of each segment. The width of the channel-shaped body portion 26 is about equal to the thickness of the body portion of the disc segments, and is shaped on its concave side to embrace in a loosely splined driving engagement the driving lugs 15 on the adjoining wheel. Appropriate clearances are provided between the body portion of the disc segments and the channel-shaped body 26 of the link to avoid impairing relative motion between the segments and the link as a result of heat distortion.

The clearance between the channel-shaped body portion 26 of each torque link, and the adjoining lug 15 is such that the disc assembly as a whole is free for displacement in its axial direction during operation of a brake or clutch in which it is used.

The torque links 14 may be made from materials selected with a view toward the particular loads imposed on them, and need not be limited to the materials selected for the segments 12.

Ordinarily and preferably the links 14, together with the segment lugs is to which they are attached, are located outside of the so-called swept area of the disc assembly which is the area of the assembly coming into frictional pressure engagement with the opposing annular braking members when the brake is engaged. Accordingly, in operation, the thinner lugs 18 and the torque links 14 operate in a zone of the disc assembly which is normally very much cooler than the thick solid body portions of the disc segments.

The disc assembly described herein as a heat sink member of a brake or clutch may be modified in an obvious manner to receive friction lining materials and therefore operate as a lining carrier. Similarly, the lugs 18 may be provided at the inner peripheral corners of the adjoining segments, so that the torque links 14 can be installed near the inner diameter of the assembly to engage an associated member having mating lugs directed toward the inner diameter of the assembly.

The holes 28 in the lugs 18 and flanges 20 through which the rivet 22 is assembled to connect the links and segments preferably has radial clearance with the rivet 22, and such holes may be slotted in an arcuate direction or in other ways as desired in accordance with the well-known practice in the art of accommodating thermal distortion at a rivet connection.

The arcuate distance or "pitch" between the drive channels in the successive links will remain substantially constant notwithstanding extreme thermal distortion of the segments themselves during periods when they are frictionally engaged with the associated brake or clutch members. Ordinarily, the thermal distortion pattern which these segments undergo is one in which the radial end edges 27 become curved concavely and the radial outer edges 19 between the lugs 18 tend to curve convexly toward the wheel with the body remaining fairly plane.

We claim:

1. A segmented friction member for a brake or clutch comprising segments assembled to form an annulus, the segments having side faces collectively forming an annular friction face, and torque link members each positively interconnecting one segment with the next adjacent segment, each torque link member having spline driving means engageable with associated brake or clutch structure and having a surface transverse to said side faces of the segments adapted to abut corresponding transverse surfaces on said segments for transmitting torque to or from said segments.

2. A segmented friction member according to claim 1 in which each torque link member is located at the corners of its respective segments near one of the peripheral edges of such segments.

3. A segmented friction member according to claim 2 wherein each of said segments is of arcuate sector shape with an outer and inner peripheral edge and radially diverging side edges, and each segment having a recessed region at the corners thereof to receive said torque links.

4. A segmented friction member according to claim 2 wherein each torque link member has an articulated positive connection with its respective segments to accommodate limited displacement of the segments relative to each other.

5. A segmented friction member according to claim 1 wherein each torque link member has its opposing ends fastened to their respective segments by an articulated connection providing for relative displacement of the individual segments in the plane of annulus.

6. A segmented friction member for a brake or clutch comprising a series of arcuate segments of sector-like shape assembled to form an annulus, the segments having side faces collectively forming an annular friction face, each segment having an outer and an inner peripheral edge and opposing side edges oriented along radii of the assembled annulus, the segments being spaced one from another at their radial edges, an individual torque link member interconnecting each segment with the adjoining segment between corners of such segments near one of said peripheral edges and a radial edge thereof, each torque link member including opposing flanges projecting into engagement with its respective segments, and having spline driving means engageable with an associated brake or clutch structure and having a surface transverse to said side faces of the segments adapted to abut corresponding transverse surfaces on said segments for transmitting torque to or from the friction member while permitting displacement of the annulus in its axial direction, and fastening means providing a positive articulated engagement of each flange of said torque link member with the corners of its respective segments to permit relative displacement of the segments with respect to each other in the plane of said annulus resulting from thermal distortion of the segments.

7. A segmented friction member according to claim 6 wherein each torque link is engaged with the corners of respective segments near the outer peripheral edges.

8. A segmented friction member according to claim 6 wherein the corners of each segment engaged by the flanges of the torque link member are recessed to receive said flanges so that the flange is substantially flush with the adjoining friction face of the segment.

9. A segmented friction member for a brake or clutch comprising arcuate segments with side faces collectively forming an annular friction face, and torque link members interconnecting one segment with the next adjacent segment at a location offset radially from said annular friction face, each torque link member having a positive connection at its opposing ends with its respective segments and having spline driving means intermediate said connections engageable with associated brake or clutch structure for transmitting torque to or from said segments.

10. A segmented friction member according to claim 9 wherein each said segment includes a portion on a peripheral edge thereof for engagement with said torque link member.

11. A segmented friction member according to claim 10 wherein said torque link member has end portions terminating in overlapping relation with said peripheral edge portions of said segment and having means intermediate said ends of said torque link member engageable with associated brake or clutch structure for transmitting torque to or from said segments.